(12) United States Patent
Hyde-Thomson et al.

(10) Patent No.: US 6,487,533 B2
(45) Date of Patent: *Nov. 26, 2002

(54) UNIFIED MESSAGING SYSTEM WITH AUTOMATIC LANGUAGE IDENTIFICATION FOR TEXT-TO-SPEECH CONVERSION

(75) Inventors: Henry C. A. Hyde-Thomson, London (GB); Roger Liron, Sutton (GB)

(73) Assignee: Avaya Technology Corporation, Basking Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,296

(22) Filed: Jan. 10, 2000

(65) Prior Publication Data

US 2001/0056348 A1 Dec. 27, 2001

Related U.S. Application Data

(63) Continuation of application No. 09/099,744, filed on Jun. 18, 1998.
(60) Provisional application No. 60/051,720, filed on Jul. 3, 1997, and provisional application No. 60/052,720, filed on Jul. 3, 1997.

(51) Int. Cl.$^7$ .................... G10L 13/08; G06F 17/28
(52) U.S. Cl. .................... 704/260; 704/8; 704/277; 379/88.06; 379/88.16
(58) Field of Search .................... 704/2, 3, 8, 260, 704/270, 277; 379/88.05, 88.06, 88.16

(56) References Cited

U.S. PATENT DOCUMENTS

| 4,829,580 A | * | 5/1989 | Church ..................... 704/260 |
| 4,837,798 A | | 6/1989 | Cohen et al. |
| 4,866,755 A | * | 9/1989 | Hashimoto ............... 379/88.06 |
| 5,040,218 A | * | 8/1991 | Vitale et al. ............... 704/260 |

(List continued on next page.)

FOREIGN PATENT DOCUMENTS

| EP | 0 615 368 A2 | 9/1994 |
| EP | 0 621 553 A2 | 10/1994 |

OTHER PUBLICATIONS

Lin–Shan Lee and Ming Oun–Young, "Voice and Text Messaging—A Concept to Integrate the Services of Telephone and Data Networks", 1988, Taipei, Taiwan, pp. 408–412.

(List continued on next page.)

Primary Examiner—Marsha D. Banks-Harold
Assistant Examiner—Martin Lerner
(74) Attorney, Agent, or Firm—Haverstock & Owens LLP

(57) ABSTRACT

A unified messaging system includes a voice gateway server coupled to an electronics mail system and a private branch exchange (PBX). The voice gateway server provides voice messaging services to a set of subscribers. Within the voice gateway server, a trigraph analyzer sequentially examines 3-character combinations within a text message; determines occurrence frequencies for the character combinations; compares the occurrence frequencies with reference occurrence statistics modeled from text samples written in particular languages; and generates a language identifier and a likelihood value for the text message. Based upon the language identifier, a message inquiry unit selects an appropriate text-to-speech engine for converting the text message into computer-generated speech that is played to a subscriber.

25 Claims, 5 Drawing Sheets

U.S. PATENT DOCUMENTS

| | | | |
|---|---|---|---|
| 5,062,143 A | | 10/1991 | Schmitt |
| 5,384,701 A | | 1/1995 | Stentiford et al. |
| 5,412,712 A | * | 5/1995 | Jennings ..................... 704/277 |
| 5,418,951 A | | 5/1995 | Damashek |
| 5,475,733 A | | 12/1995 | Eisendofer et al. |
| 5,475,738 A | | 12/1995 | Penzias |
| 5,479,411 A | | 12/1995 | Klein |
| 5,524,137 A | | 6/1996 | Rhee |
| 5,530,740 A | | 6/1996 | Irribarren et al. |
| 5,557,659 A | | 9/1996 | Hyde-Thompson |
| 5,615,301 A | * | 3/1997 | Rivers ........................... 704/2 |
| 5,712,901 A | | 1/1998 | Meermans |
| 5,724,526 A | * | 3/1998 | Kunita ....................... 704/277 |
| 5,737,395 A | * | 4/1998 | Irribarren ................. 379/88.13 |
| 5,765,131 A | | 6/1998 | Stentiford et al. .......... 704/277 |
| 5,771,273 A | * | 6/1998 | McAllister et al. ....... 379/88.01 |
| 5,797,124 A | | 8/1998 | Walsh et al. ................ 704/275 |
| 5,825,854 A | | 10/1998 | Larson et al. |
| 5,870,454 A | | 2/1999 | Dahlen .................... 379/88.14 |
| 5,875,232 A | | 2/1999 | Wolf |
| 5,897,617 A | | 4/1999 | Collier ....................... 704/260 |
| 5,905,774 A | | 5/1999 | Tatchell et al. .......... 379/88.04 |
| 5,943,398 A | * | 8/1999 | Klein et al. ............... 379/88.13 |
| 5,963,518 A | * | 10/1999 | Porter ..................... 379/88.17 |
| 5,966,685 A | * | 10/1999 | Flanagan et al. .............. 704/8 |
| 5,987,100 A | | 11/1999 | Fortman et al. ......... 379/88.14 |
| 5,991,365 A | | 11/1999 | Pizano et al. ............ 379/88.13 |
| 5,999,611 A | | 12/1999 | Tatchell et al. ............. 379/211 |
| 6,002,998 A | | 12/1999 | Martino et al. ................ 704/9 |
| 6,061,718 A | | 5/2000 | Nelson ....................... 709/206 |
| 6,085,162 A | * | 7/2000 | Cherny ....................... 704/277 |
| 6,141,642 A | | 10/2000 | Oh ............................. 704/260 |
| 6,160,877 A | | 12/2000 | Tatchell et al. ............. 379/197 |
| 6,215,859 B1 | | 4/2001 | Hanson ................... 379/88.22 |
| 6,243,681 B1 | | 6/2001 | Guji et al. .................. 704/260 |
| 6,292,782 B1 | | 9/2001 | Weideman ................. 704/273 |

OTHER PUBLICATIONS

J.H. Page and A.P. Breen, "The Laureate Text–to–Speech System—Architecture and Applications", BT Technology Journal, Jan., 1996, Great Britain, pp. 57–67.

Clive Souter and Gavin Churcher, "Natural Language Identification Using Corpus–Based Models," Hermes Journal of Linguistics 13: 183–204, 1994.

"Broadcasting Via Internet," Steve Mack, RealNetworks, John Wiley & Sons, Inc. Dec. 27, 1999.

"Understanding the Voice–Enabled Internet," Ed Margulies, First Edition, Aug. 1996, Flatiron Publishing, Inc., pp. 10–10 to 10–12 and 10–20 to 10–22.

Javkin et al., "A Multi–lingual Text–to–Speech System," 1989 International Conference on Acoustics, Speech, and Signal Processing, May 1989, vol. 1, pp. 242 to 245.*

J.G. Wilpon, et al., "Isolated Word Recognition Over the DDD Telephone Network Results of Two Extensive Field Studies" S1.10, AT&T Bell Laboratories, Speech Research Depart., 1988 IEEE, pp. 55–58.

W.R. Belfield et al., "Speaker Verification Based on a Vector Quantization Approach that Incorporates Speaker Cohort Models and a Linear Discriminator" Lucent Technologies, Inc., 1997 IEEE, pp. 4525–4529.

* cited by examiner

UNIFIED MESSAGING SYSTEM WITH AUTOMATIC LANGUAGE IDENTIFICATION FOR TEXT-TO-SPEECH CONVERSION

CROSS-REFERENCE TO RELATED APPLICATIONS

This application is a continuation application filed from and claiming priority under 35 U.S.C. § 120 of co-pending non-provisional U.S. patent application Ser. No. 09/099,744, filed on Jun. 18, 1998, entitled "UNIFIED MESSAGING SYSTEM WITH AUTOMATIC LANGUAGE IDENTIFICATION FOR TEXT-TO-SPEECH CONVERSION," which claims priority, under 35 U.S.C. § 119(e) of provisional U.S. patent application Ser. No. 60/051,720, filed on Jul. 3, 1997, and entitled "UNIFIED MESSAGING SYSTEM WITH AUTOMATIC LANGUAGE IDENTIFICATION FOR TEXT-TO-SPEECH CONVERSION." This application also claims priority under 35 U.S.C. § 120 of co-pending non-provisional U.S. patent application Ser. No. 09/479,333, filed on Jan. 7, 2000, entitled "UNIFIED MESSAGING SYSTEM WITH VOICE MESSAGING AND TEXT MESSAGING USING TEXT-TO-SPEECH CONVERSION." application Ser. No. 09/099,744, filed on Jun. 18, 1998, application Ser. No. 09/479,333, filed on Jan. 7, 2000, and provisional application Ser. No. 60/052,720, filed Jul. 3, 1997, are hereby incorporated by reference. In addition, this application relates to and incorporates by reference U.S. Pat. No. 5,557,659, entitled "ELECTRONIC MAIL SYSTEM HAVING INTEGRATED VOICE MESSAGES."

FIELD OF THE INVENTION

The present invention relates to systems and methods for voice and text messaging, as well as systems and method for language recognition. More particularly, the present invention is a communications system that automatically identifies a language associated with a text message, and performs an appropriate text-to-speech conversion.

BACKGROUND OF THE INVENTION

Computer-based techniques for converting text into speech have become well-known in recent years. Via such techniques, textual data is translated to audio information by a text-to-speech conversion "engine," which most commonly comprises software. Examples of text-to-speech software include Apple Computer's Speech Manager (Apple Computer Corporation, Cupertino, Calif.), and Digital Equipment Corporation's DECTalk (Digital Equipment Corporation, Cambridge, Mass.). In addition to converting textual data into speech, such software is responsive to user commands for controlling volume, pitch, rate, and other speech-related parameters.

A text-to-speech engine generally comprises a text analyzer, a syntax and context analyzer, and a synthesis module. The text analyzer, in conjunction with the syntax and context analyzer, utilizes a rule-based index to identify fundamental grammatical units within textual data. The fundamental grammatical units are typically word and/or phoneme-based, and the rule-based index is correspondingly referred to as a phoneme library. Those skilled in the art will understand that the phoneme library typically includes a word-based dictionary for the conversion of orthographic data into a phonemic representation. The synthesis module either assembles or generates speech sequences corresponding to the identified fundamental grammatical units, and plays the speech sequences to a listener.

Text-to-speech conversion can be very useful within the context of unified or integrated messaging systems. In such messaging systems, a voice processing server is coupled to an electronic mail system, such that a user's e-mail in-box provides message notification as well as access to messaging services for e-mail messages, voice messages, and possibly other types of messages such as faxes. An example of a unified messaging system is Octel's Unified Messenger (Octel Communications Corporation, Milpitas, Calif.). Such systems selectively translate an e-mail message into speech through the use of text-to-speech conversion. A user calling from a remote telephone can therefore readily listen to both voice and e-mail messages. Thus, a unified messaging system employing text-to-speech conversion eliminates the need for a user to have direct access to their computer during message retrieval operations.

In many situations, messaging system users can expect to receive textual messages written in different languages. For example, a person conducting business in Europe might receive e-mail messages written in English, French, or German. To successfully convert text into speech within the context of a particular language requires a text-to-speech engine designed for that language. Thus, to successfully convert French text into spoken French requires a text-to-speech engine designed for the French language, including a French-specific phoneme library. Attempting to convert French text into spoken language through the use of an English text-to-speech engine would likely produce a large amount of unintelligible output.

In the prior art, messaging systems rely upon a human reader to specify a given text-to-speech engine to be used in converting a message into speech. Alternatively, some systems enable a message originator to specify a language identification code that is sent with the message. Both approaches are inefficient and inconvenient. What is needed is a messaging system providing automatic written language identification as a prelude to text-to-speech conversion.

SUMMARY OF THE INVENTION

The present invention is a unified messaging system providing automatic language identification for the conversion of textual messages into speech. The unified messaging system comprises a voice gateway server coupled to a computer network and a Private Branch Exchange (PBX). The computer network includes a plurality of computers coupled to a file server, through which computer users identified in an electronic mail (e-mail) directory exchange messages. The voice gateway server facilitates the exchange of messages between computer users and a telephone system, and additionally provides voice messsaging services to subscribers, each of whom is preferably a computer user identified in the e-mail directory.

The voice gateway server preferably comprises a voice board, a network interface unit, a processing unit, a data storage unit, and a memory wherein a set of voice messaging application units; a message buffer; a plurality of text-to-speech engines and corresponding phoneme libraries; a trigraph analyzer; and a set of corecurrence libraries reside. Each voice messaging application unit comprises program instructions for providing voice messaging functions such as call answering, automated attendant, and message store/forward operations to voice messaging subscribers.

A message inquiry unit directs message playback operations. In response to a subscriber's issuance of a voice message review request, the message inquiry unit plays the subscriber's voice messages in a conventional manner. In response to a text message review request, the message inquiry unit initiates automatic language identification operations, followed by a text-to-speech conversion performed in accordance with the results of the language identification operations.

The trigraph analyzer examines a text sequence, and performs language identification operations by first determining the occurrence frequencies of sequential 3-character combinations within the text, and then comparing the determined occurrence frequencies with reference occurrence statistics for various languages. The set of reference occurrence statistics associated with a given language are stored together as a corecurrence library. The trigraph analyzer determines a closest match between the determined occurrence frequencies and a particular corecurrence library, and returns a corresponding language identifier and likelihood value to the message inquiry unit.

The message inquiry unit subsequently selects a text-to-speech engine and an associated phoneme library, and initiates the conversion of the text message into computer-generated speech that is played to the subscriber in a conventional manner.

DETAILED DESCRIPTION OF THE PREFERRED EMBODIMENTS

Figure 1:
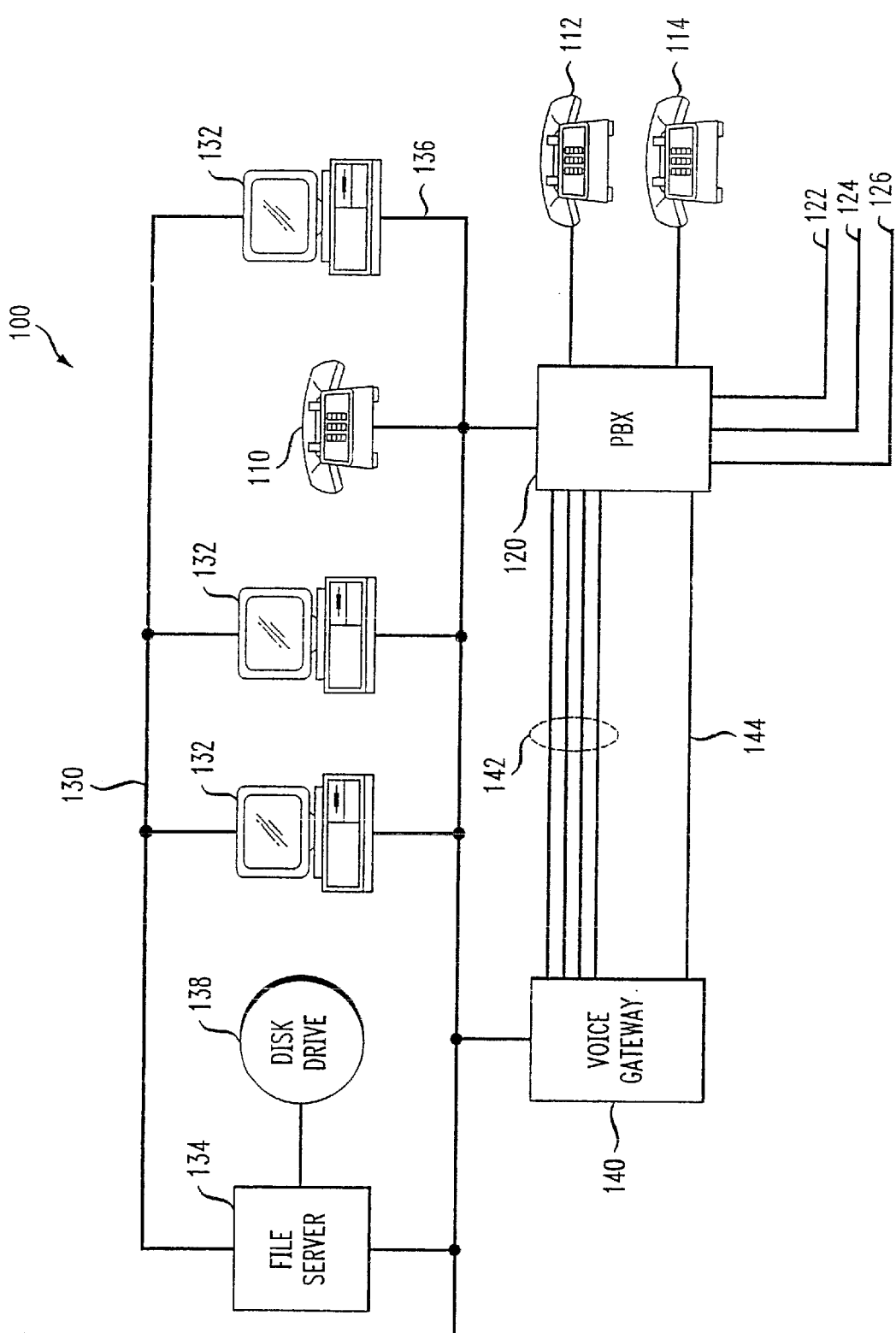
FIG. 1 is a block diagram of a preferred embodiment of a unified messaging system constructed in accordance with the present invention.

Referring now to FIG. 1, a block diagram of a preferred embodiment of a unified messaging system 100 constructed in accordance with the present invention is shown. The unified messaging system 100 comprises a set of telephones 110, 112, 114 coupled to a Private Branch Exchange (PBX) 120; a computer network 130 comprising a plurality of computers 132 coupled to a file server 134 via a network line 136, where the file server 134 is additionally coupled to a data storage device 138; and a voice gateway server 140 that is coupled to the network line 136, and coupled to the PBX 120 via a set of telephone lines 142 as well as an integration link 144. The PBX 120 is further couple to a telephone network via a collection of trunks 122, 124, 126. The unified messaging system 100 shown in FIG. 1 is equivalent to the described in U.S. Pat. No. 5,557,659, entitled "Electronic Mail System Having Integrated Voice Messages," which is incorporated herein by reference. Those skilled in the art will recognize that the teachings of the present invention are applicable to essentially any unified or integrated messaging environment.

In the present invention, conventional software executing upon the computer network 130 provides file transfer services, group access to software applications, as well as an electronic mail (e-mail) system through which computer user can transfer messages as well a message attachments between their computers 132 via the file server 134. In an exemplary embodiment, Microsoft Exchange™ software (Microsoft Corporation, Redmond, Wash.) executes upon the computer network 130 to provide such functionality. Within the file server 134, an e-mail directory associates each computer user's name with a message storage location, or "in-box," and a network address, in a manner that will be readily understood by those skilled in the art. The voice gateway server 140 facilitates the exchange of messages between the computer network 130 and a telephone system. Additionally, the voice gateway server 140 provides voice messaging service such as call answering, automated attendant, voice message store and forward, and message inquiry operations to voice messaging subscribers. In the preferred embodiment, each subscriber is a computer user identified in the e-mail directory, that is, having a computer 132 coupled to the network 130. Those skilled in the art will recognize that in an alternate embodiment, the voice messaging subscribers could be a subset of computer users. In yet another alternate embodiment, the computer users could be a subset of a larger pool of voice messaging subscribers, which might be useful when the voice gateway server is primarily used for call answering.

Figure 2:
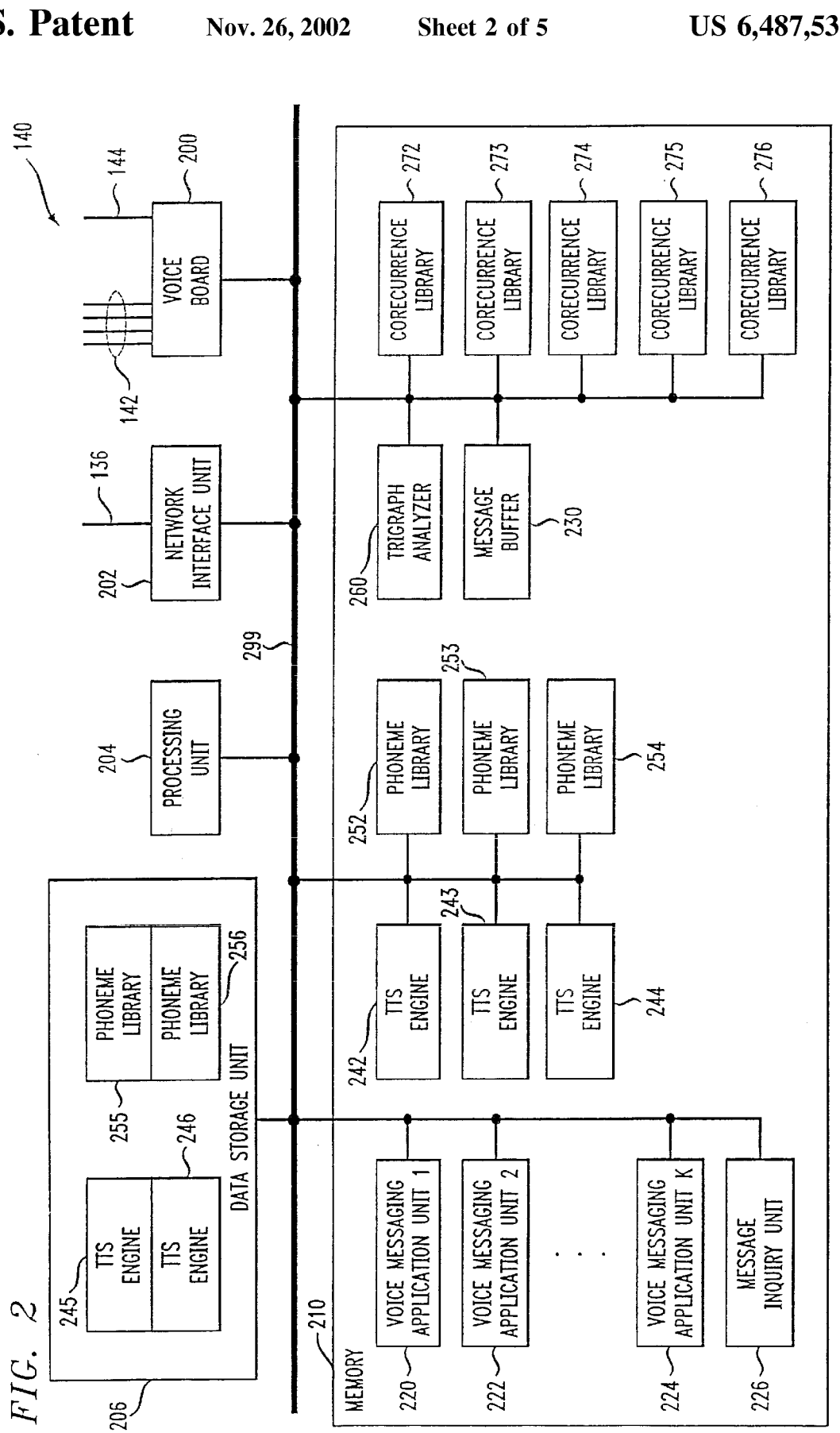
FIG. 2 is a block diagram of a first and preferred embodiment of a voice server constructed in accordance with the present invention.

Referring also now to FIG. 2, a block diagram of a first and preferred embodiment of a voice gateway server 140 constructed in accordance with the present invention is shown. In the preferred embodiment, the voice gateway server 140 comprises a voice board 200, a network interface unit 202, a processing unit 204, a data storage unit 206, and a memory 210 wherein a plurality of voice messaging application units 220, 222, 224, 226; a message buffer 230; a set of text-to-speech engines 242, 243, 244 and corresponding phoneme libraries 252, 253, 254; a trigraph analyzer 260; and a plurality of corecurrence libraries 272, 273, 274, 275, 276 reside. Each element within the voice gateway server 140 is coupled to a common bus 299. The network interface unit 202 is additionally coupled to the network line 136, and the voice board 200 is coupled to the PBX 120.

The voice board 200 preferably comprises conventional circuitry that interfaces a computer system with telephone switching equipment, and provides telephony and voice processing functions. The network interface unit 202 preferably comprises conventional circuitry that manages data transfers between the voice gateway server 140 and the computer network 130. In the preferred embodiment, the processing unit 204 and the data storage unit 206 are also conventional.

The voice messaging application units 220, 222, 224, 226 provide voice messaging services to subscribers, including call answering, automated attendant, and voice message store and forward operations. A message inquiry unit 226 directs telephone-based message playback operations in response to a subscriber request. In response to a voice message review request, the message inquiry unit 226 initiates the retrieval of a voice message associated with the subscriber's in-box, followed by the playing of the voice message to the user via the telephone in a conventional manner. In response to a text message review request, the message inquiry unit 226 initiates retrieval of a text message associated with the subscriber's in-box, followed by automatic language recognition and text-to-speech conversion operations, as described in detail below with reference to FIG. 3. In the preferred embodiment, each voice messaging application unit 220, 222, 224, 226 comprises program instruction sequences that are executable by the processing unit 204.

The message buffer 230 comprises a portion of the memory 200 reserved for temporarily storing messages before or after message exchange with the file server 134. The text-to-speech engines 242, 243, 244, 245, 246 preferably comprise conventional software for translating textual data into speech. Those skilled in the art will readily understand that in an alternate embodiment, one or more portions of a text-to-speech engine 242, 243, 244, 245, 246 could be implemented using hardware.

The number of text-to-speech engines 242, 243, 244 resident within the memory 210 at any given time is determined according to the language environment in which the present invention is employed. In the preferred embodiment, the memory 210 includes a text-to-speech engine 242, 243, 244 for each language within a group of most-commonly expected languages. Additional text-to-speech engines 245, 246 preferably reside upon the data storage unit 206, and are loaded into the memory 210 when text-to-speech conversion for a language outside the aforementioned group is required, as described in detail below. In an exemplary embodiment, text-to-speech engines 242, 243, 244 corresponding to English, French, and German reside within the memory 210, while text-to-speech engines 245, 246 for Portuguese, Italian, and/or other languages reside upon the data storage unit 206. Those skilled in the art will recognize that in an alternate embodiment, the number of text-to-speech engines 242, 243, 244 resident within the memory could be determined according to a memory management technique, such as virtual memory methods, where text-to-speech engines 242, 243, 244 are conventionally swapped out to the data storage unit 206 as required.

The memory 210 preferably includes a conventional phoneme library 252, 253, 254 corresponding to each text-to-speech engine 242, 243, 244 residing therein. In the preferred embodiment, a phoneme library 255, 256 also resides upon the data storage unit 206 for each text-to-speech engine 245, 246 stored thereupon.

The present invention preferably relies upon n-graph method for textual language identification, in particular, techniques developed by Clive Souter and Gavin Churcher at the University of Leeds in the United Kingdom, as reported in 1) "Bigram and Trigram Models for Language Identification and Classification," Proceedings of the AISB Workshop on Computational Linguistics for Speech and Handwriting Recognition, University of Leeds, 1994; 2) "Natural Language Identification Using Corpus-Based Models," Hermes Journal of Linguistics 13: 183–204, 1994; and 3) "N-gram Tools for Generic Symbol Processing," M. Sc. Thesis of Phil Cave, School of Computer Studies, University of Leeds, 1995.

In n-graph language identification, the occurrence frequencies of successive n-character combinations within a textual message are compared with reference n-character occurrence statistics associated with particular languages. The reference statistics for any given language are automatically derived or modeled from text samples taken from that language. Herein, the reference n-character occurrence statistics for a given language are stored together as a corecurrence library 272, 273, 274, 275, 276.

The present invention preferably employs the trigraph analyzer 260 and corecurrence libraries 272, 273, 274, 275, 276 to perform trigraph-based language identification, that is, language identification based upon the statistical occurrences of three-letter combinations. In the preferred embodiment, the memory 210 includes a corecurrence library 272, 273, 274, 275, 276 corresponding to each text-to-speech engine 242, 243, 244, within the memory 210 as well as each text-to-speech engine 245, 246 stored upon the data storage device 206.

The trigraph analyzer 260 returns a language identifier and a likelihood or percentage value that indicates relative language identification certainty. As developed at the University of Leeds, the trigraph analyzer 260 is approximately 100% accurate when textual input comprises at least 175 characters. The trigraph analyzer 260 additionally maintains high language identification accuracy, typically greater than 90%, for shorter-length text sequences. In an exemplary embodiment, the voice gateway server 140 is a personal computer having a 200 MHz Intel Pentium™ Processor (Intel Corporation, Santa Clara, Calif.); 128 Megabytes of Random Access Memory (RAM); an Ethernet-based network interface unit 202; a Redundant Array of Inexpensive Disks (RAID) drive serving as the data storage unit 206; a Rhetorex voice board (Rhetorex Corporation, San Jose,, Calif.); DECTalk text-to-speech engines 242, 243, 244, 245, 246 and corresponding phoneme libraries 252, 253, 254, 255, 256 (Digital Equipment Corporation, Cambridge, Mass.); the aforementioned trigraph analyzer 260 and associated corecurrence libraries 272, 273, 274, 275, 276 developed at the University of Leeds; and voice messaging application units 220, 222, 224, 226 implemented using Octel's Unified Messenger software (Octel Communications Corporation, Milpitas, Calif.).

Figure 3:
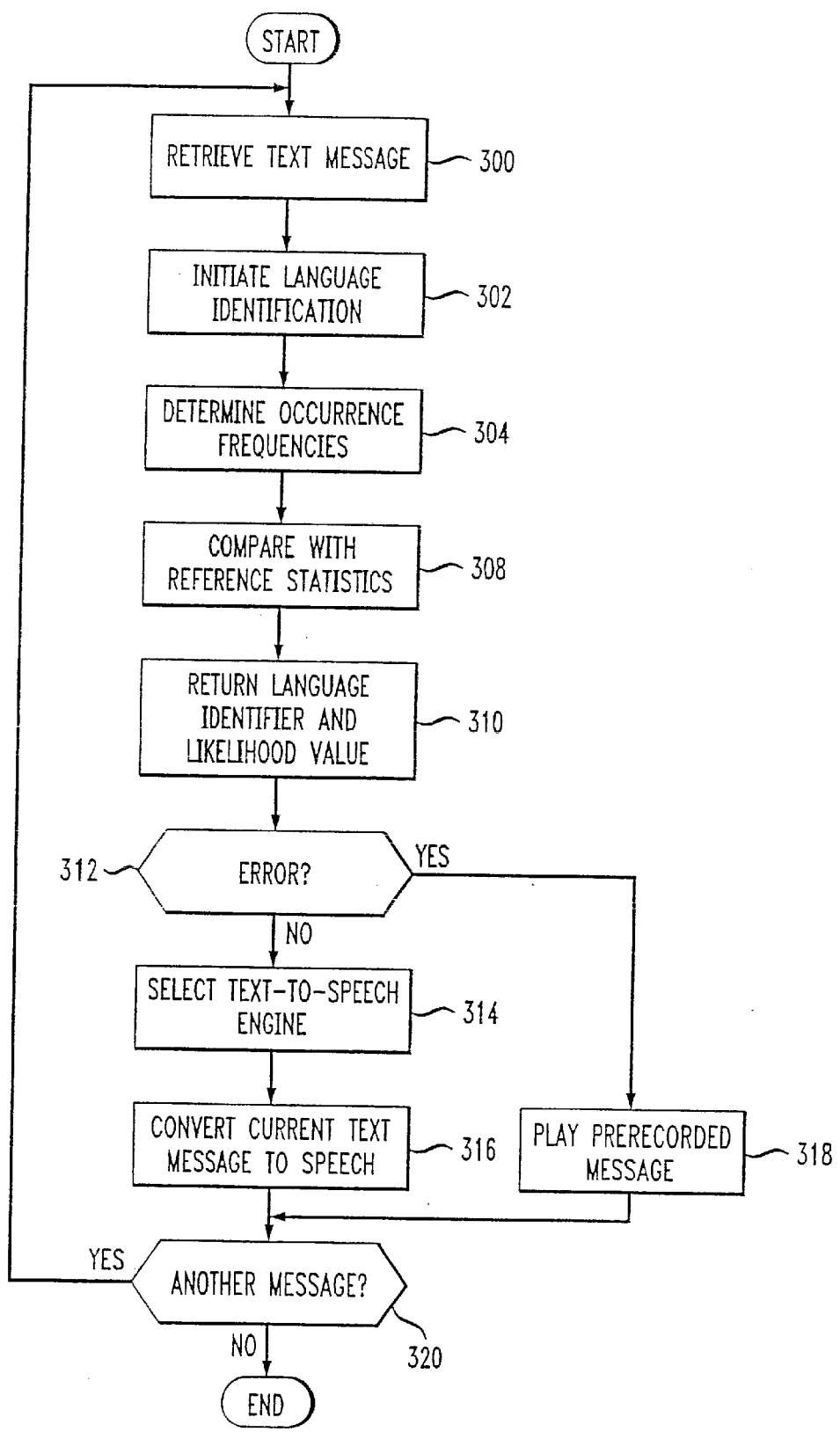
FIG. 3 is a flowchart of a first and preferred method for providing automatic language identification for text-to-speech conversion in the present invention.

Referring now to FIG. 3, a flowchart of a first and preferred method for providing automatic language identification for text-to-speech conversion is shown. The preferred method begins in step 300 in response to a subscriber's issuance of a text message review request, with the message inquiry unit 226 retrieving a text message from the subscriber's in-box, or from a particular data file or folder as specified by the subscriber. In the preferred embodiment, the subscriber's in-box corresponds to a file server storage location, and the retrieved text message is transferred to the message buffer 230. Following step 300, the message inquiry unit 226 issues an identification directive to the trigraph analyzer 260 in step 302, thereby initiating language identification.

In response to the identification directive, the trigraph analyzer 260 examines successive 3-character combinations within the text message currently under consideration, and determines occurrence frequencies for the character combinations in step 304. In the preferred embodiment, the trigraph analyzer 260 examines the first 175 characters of the text message in the event that the text message is sufficiently long; otherwise, the trigraph analyzer 260 examines the longest character sequence possible.

Following the determination of the occurrence frequencies for the current text message, the trigraph analyzer 260 compares the occurrence frequencies with the reference occurrence statistics in each corecurrence library 272, 273, 274, 275, 276 and determines a closest match with a particular corecurrence library 272, 273, 274, 275 in step 308. Upon determining the closest match, the trigraph analyzer 260 returns a language identifier and an associated likelihood value to the message inquiry unit 226 in step 310. Those skilled in the art will recognize that the trigraph analyzer 260 could return a set of language identifiers and a likelihood value corresponding to each language identifier in an alternate embodiment.

As long as the text message is written in a language corresponding to one of the corecurrence libraries 272, 273, 274, 275, 276, the correlation between the occurrence frequencies and the reference occurrence statistics is likely to be sufficient for successful language identification. If the text message is written in a language that does not correspond to any of the corecurrence libraries 272, 273, 274, 275, 276 present, the correlation will be poor, and a closest match cannot be determined. In the event that the likelihood value returned by trigraph analyzer 260 is below a minimum acceptable threshold (for example, 20%), the message inquiry unit 226 plays a corresponding prerecorded message to the subscriber via steps 312 and 318. An exemplary prerecorded message could be "language identification unsuccessful."

Upon receiving the language identifier and an acceptable likelihood value, the message inquiry unit 226 selects the appropriate text-to-speech engine 242, 243, 244, 245, 246 in step 314. In the event that the text-to-speech engine 244, 245 and its associated phoneme library 254, 255 do not presently reside within the memory 210, the message inquiry unit 226 transfers the required text-to-speech engine 244, 245 and the corresponding phoneme library 254, 255 from the data storage unit 206 into the memory 210.

After step 314, the message inquiry unit 226 issues a conversion directive to the selected text-to-speech engine 242,243,244,245,246 in step 316, following which the text message currently under consideration is converted to speech and played to the subscriber in a conventional manner. Upon completion of step 316, the message inquiry unit 226 determines whether another text message in the subscriber's in-box, or as specified by the subscriber, requires consideration in step 320. If so, the preferred method proceeds to step 300; otherwise, the preferred method ends.

In an alternate embodiment, steps 312 and 318 could be omitted, such that step 310 directly proceeds to step 314 to produce a "best guess" text-to-speech conversion played to the subscriber. In such an alternate embodiment, the message inquiry unit 226 could 1) disregard the likelihood value; or 2) select the language identifier associated with a best likelihood value in the event that multiple language identifiers and likelihood values are returned.

In the preferred embodiment, textual language identification is performed, followed by text-to-speech conversion in the appropriate language. This results in the subscriber listening to computer-generated speech that matches the language in which the original text message was written. In an alternate embodiment, textual language identification could be performed, followed by text-to-text language conversion (i.e., translation), followed by text-to-speech conversion such that the subscriber listens to computer generated speech in a language with which the subscriber is most comfortable. To facilitate this alternate embodiment, a set of subscriber language preference selections are stored as user-configuration data within a subscriber information database or directory. The subscriber information database could reside within the voice gateway server 140, or it could be implemented in association with the file server's e-mail directory in a manner those skilled in the art will readily understand. Additionally, the voice gateway server 140 is modified to include additional elements, as described in detail hereafter.

Figure 4:
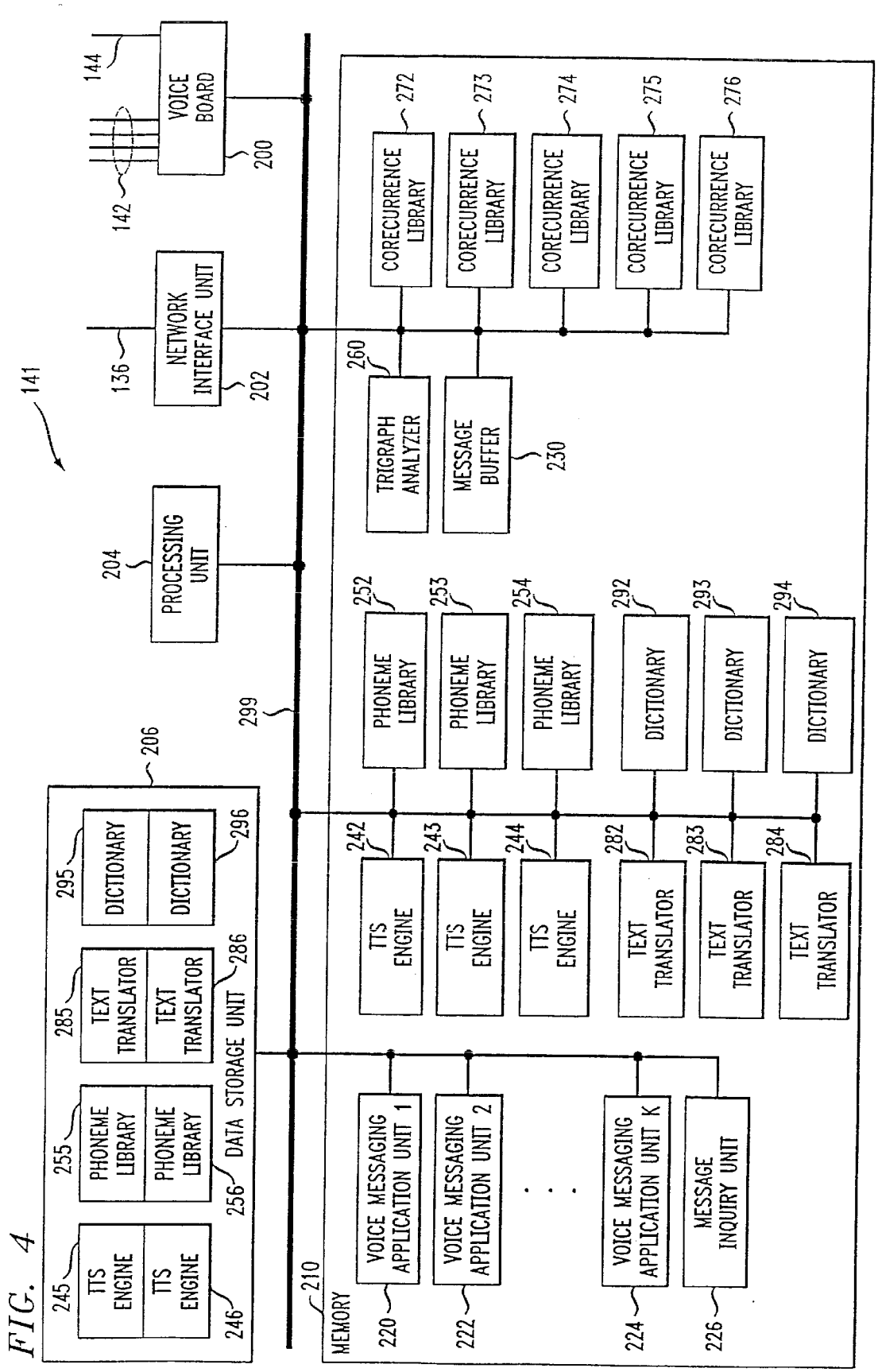
FIG. 4 is a block diagram of a second embodiment of a voice server constructed in accordance with the present invention.

Referring now to FIG. 4, a block diagram of a second embodiment of a voice gateway server 141 constructed in accordance with the present invention is shown. Elements common to both FIGS. 2 and 4 are number alike for ease of understanding. In addition to having the elements shown in FIG. 2, the second embodiment of the voice gateway server 141 includes a set of conventional text translators 282, 283, 284, 285, 286, each having an associated word dictionary 292, 293, 294, 295, 296. Those skilled in the art will understand that the word dictionaries 292, 293, 294, 295, 296 are distinct from (i.e., not equivalent to) the phoneme libraries 252, 253, 254, 255, 256 in content and manner of use, and that each text translator 282, 283, 284, 285, 286 corresponds to a particular target language available for subscriber selection. Text translators 282, 283, 284 and word dictionaries 292, 293, 294 corresponding to most-common subscriber preference selections reside within the memory 210, while those for less-frequently selected languages reside upon the data storage device 206, to be transferred into the memory 210 as required. Those skilled in the art will also understand that in an alternate embodiment, the text translators 282, 283, 284, 285, 286 and corresponding word dictionaries 292, 293, 294, 295, 296 could normally reside upon the data storage device 206, to be swapped into or out of the memory 210 as required during system operation. In an exemplary embodiment, the text translators 282, 283, 284, 285, 286 and word dictionaries 292, 293, 294, 295, 296 could be implemented using commercially-available software such as that provided by Translation Experts, Ltd. of London, England; or Language Partners International of Evanston, Ill.

Figure 5:
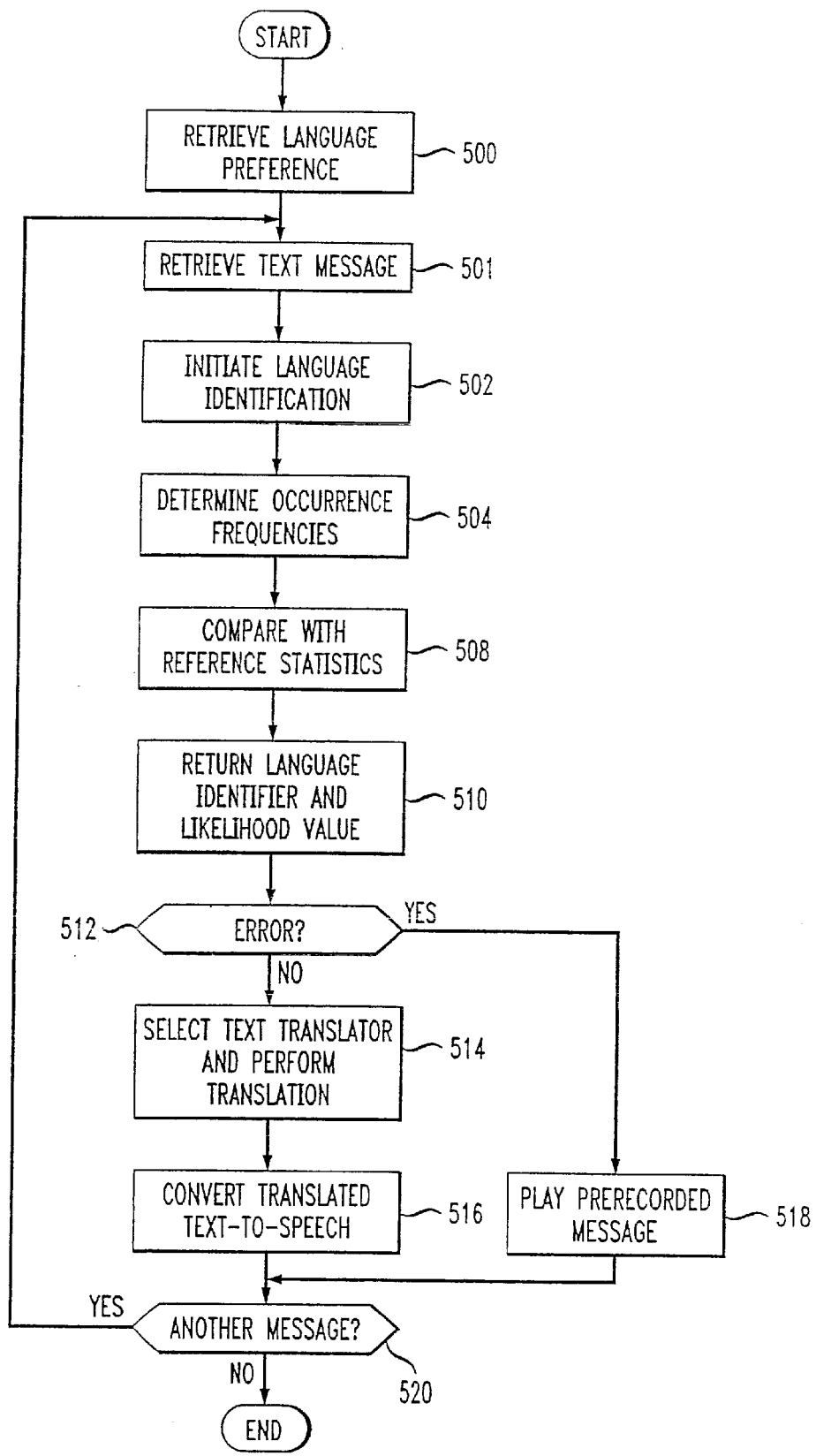
FIG. 5 is a flowchart of a second method for providing automatic language identification for text-to-speech conversion in the present invention.

Referring now to FIG. 5, a flowchart of a second method for providing automatic language identification for text-to-speech conversion is shown. The second method begins in step 500 in response to a subscriber's issuance of a text message review request, with the message inquiry unit 226 retrieving the subscriber's language preference settings. Next in step 501, the message inquiry unit retrieves a text message from the subscriber's in-box or from a data file or data folder as specified by the subscriber, and stores or copies the retrieved message into the message buffer 230. Following step 501, the message inquiry unit 226 issues an identification directive to the trigraph analyzer 260 in step 502, thereby initiating language identification. Language identification is preferably performed in steps 504 through 512 in an analogous manner to that described above in steps 304 through 312 of FIG. 3. Successful language identification results when the trigraph analyzer 260 returns a language identifier and a likelihood value greater than a minimum threshold value to the message inquiry unit 226.

Upon receiving a language identifier and an acceptable likelihood value, the message inquiry unit 226 selects the appropriate text translator 282, 283, 284, 285, 286 and associated word dictionary 292, 293, 294, 295, 296 and issues a translation directive in step 514, thereby performing the translation of the current text message into the target language given by the subscriber's language preference setting. Next, in step 516, the message inquiry unit 226 issues a conversion directive to the text-to-speech engine 242, 243, 244, 245, 246 that corresponds to the subscriber's language preference settings, causing the conversion of the translated text message to speech. The speech is preferably played to the subscriber in a conventional manner. Upon completion of step 516, the message inquiry unit 226 determines whether another text message in the subscriber's in-box or as specified by the subscriber requires consideration in step 520. If so, the preferred method proceeds to step 501; otherwise, the preferred method ends.

Those skilled in the art will recognize that in the alternate embodiment, each word dictionary 292, 293, 294, 295, 296 should include words that may be particular to a give work environment in which the present invention may be employed. For example, use of the alternate embodiment in a computer-related business setting would necessitate word dictionaries 292, 293, 294, 295, 296 that include computer-related terms to ensure proper translation. In general, the first and preferred embodiment of the present invention is more robust and flexible than the second embodiment because direct conversion of text into speech, without intermediate text-to-text translation, is not constrained by the limitations of a word dictionary and is less susceptible to problems arising from word spelling variations.

From above it can be seen that the present invention is related to a unified messaging system and includes a voice gateway server coupled to an electronic mail system and a private branch exchange (PBX). The voice gateway server provides voice messaging services to a set of subscribers. Within the voice gateway server, a tri-graph analyzer sequentially examines 3 character combinations; compares the occurrence frequencies with reference occurrence statistics modeled from text samples written in particular languages; and generates a language identifier; and a likelihood value for the text message. Based upon the language identifier, a message inquiry unit selects an appropriate text-to-speech engine for converting the text message into computer-generated speech that is played to a subscriber.

While the present invention has been described with reference to certain preferred embodiments, those skilled in the art will recognize that various modifications can be provided. For example, a language identification tool based upon techniques other than n-graph methods could be utilized instead of the trigraph analyzer 260 and associated corecurrence libraries 272, 273, 274, 275, 276. As another example, one or more text-to-speech engines 242, 243, 244, 245, 246 could be implemented via hardware, such as through "off-board" text-to-speech engines accessed through the use of remote procedure calls. As yet another example, converted speech data or translated text data could be stored for future use, which could be useful in a store-once, multiple-playback environment. The description herein provides for these and other variations upon the present invention, which is limited only by the following claims.

We claim:

1. A method of operating language-based conversion of a present text message into speech, the method comprising the following steps:
    a. retrieving the present text message;
    b. automatically generating a language identifier corresponding to the present text message, wherein the step of generating includes:
        (1) examining a sequence of characters of the present text message;
        (2) determining an actual frequency of occurrence of character combinations within the sequence of characters of the present text message; and
        (3) matching the actual frequency of occurrence of the character combinations within the sequence of characters of the present text message with one of a plurality of corecurrence libraries;
    c. converting the present text message directly into computer-generated speech in a language corresponding to the language identifier using a language-specific text-to-speech engine, wherein the language-specific text-to-speech engine is selected according to the language identifier; and
    d. playing the computer generated speech to a subscriber.

2. The method as claimed in claim 1, wherein the step of converting is performed by the language-specific text-to-speech engine utilizing a phoneme library.

3. The method as claimed in claim 1, further comprising the following steps:
    a. sensing a subsequent text message; and
    b. repeating the steps of retrieving, generating, converting, and playing in response to the step of sensing.

4. The method as claimed in claim 1, wherein the step of matching further comprising the steps of:
    a. comparing the actual frequency of occurrence with each of a plurality of reference frequencies wherein each of the plurality of reference frequencies corresponds to one of the plurality of corecurrence libraries; and
    b. determining a best match between the actual frequency of occurrence and one of the plurality of reference frequencies.

5. The method as claimed in claim 1, wherein the step of examining comprises using a trigraph analyzer for inspecting the character combinations and wherein the character combinations comprise three consecutive characters within the sequence of characters.

6. The method as claimed in claim 1, wherein the sequence of characters is found in a first portion of the present text message.

7. The method as claimed in claim 1, wherein the step of matching further comprising the following steps:
    a. comparing the actual frequency of occurrence with each of a plurality of reference frequencies wherein each of the plurality of reference frequencies corresponds to one of the plurality of corecurrence libraries; and
    b. determining that a sufficient number of matches exist between the actual frequency of occurrence and one of the plurality of reference frequencies.

8. The method as claimed in claim 7, wherein the step of matching is performed when there is the sufficient number of matches between the actual frequency of occurrence and one of the plurality of reference frequencies.

9. The method as claimed in claim 7, further comprising the step of terminating the method when the sufficient number of matches does not exist.

10. A method of providing language-based conversion of an original text message into speech for a user comprising the following steps:
    a. retrieving the original text message;
    b. automatically generating a language identifier corresponding to the original text message, wherein the step of generating includes:
        (1) examining a sequence of characters of the original text message;
        (2) determining an actual frequency of occurrence of character combinations within the sequence of characters; and
        (3) matching the frequency of occurrence of the character combinations with one of a plurality of corecurrence libraries;
    c. automatically selecting an appropriate one text translator from a plurality of text translators, wherein each of the plurality of translators corresponds to one of a plurality of languages and the appropriate one text translator is selected based upon the language identifier;
    d. translating the original text message into a translated text message in a user selected language in response to the appropriate text translator;
    e. converting the translated text message into computer generated speech based upon the user selected language; and
    f. playing the computer generated speech to the user.

11. The method as claimed in claim 10, further comprising the following step: polling the user for the user selected language.

12. The method as claimed in claim 10, wherein the step of matching further comprising the following steps:
 a. comparing the actual frequency of occurrence with each of a plurality of reference frequencies wherein each of the plurality of reference frequencies corresponds to one of the plurality of corecurrence libraries; and
 b. determining that there is a sufficient number of matches between the actual frequency of occurrence and one of the plurality of reference frequencies.

13. The method as claimed in claim 10, wherein the step of matching further comprising the following steps:
 a. comparing the actual frequency of occurrence with each of a plurality of reference frequencies wherein each of the plurality of reference frequencies corresponds to one of the plurality of corecurrence libraries; and
 b. determining a best match between the actual frequency of occurrence and the plurality of reference frequencies.

14. A messaging system for converting a text message into computer generated speech, the system comprising:
 a. means for storing the text message;
 b. means for automatically generating a language identifier corresponding to the text message wherein the means for automatically generating is coupled to the means for storing, wherein the means for generating includes means for determining an actual frequency of occurrence of character combinations within a sequence of characters of the text message and means for comparing the actual frequency of occurrence of the character combinations within the sequence of characters with a plurality of reference frequencies wherein each reference frequency corresponds to a particular corecurrence library;
 c. a plurality of text-to-speech engines coupled to the means for storing wherein each of the plurality of text-to-speech engines corresponds to one of a plurality of languages and an appropriate one text-to-speech engine based on the language identifier converts the text message into the computer generated speech; and
 d. means for playing the computer-generated speech to a subscriber.

15. The system as claimed in claim 14, further comprises a phoneme library coupled to the text to speech engine for converting the text message into the computer generated speech.

16. The system as claimed in claim 14, wherein the means for automatically generating further comprises a trigraph analyzer to formulate an occurrence frequency of the text message based on examining a combination of three consecutive characters within the text message.

17. The messaging system as claimed in claim 14, wherein the means for comparing the actual frequency of occurrence of the character combinations within the sequence of characters of the text message further comprises means for determining a closest match between the actual frequency of occurrence of the character combinations and one of the plurality of reference frequencies.

18. The messaging system as claimed in claim 17 wherein:
 a. the means for determining the actual frequency of occurrence of the character combinations further comprises:
  1. means for dividing the sequence of characters of the present text messages into a plurality of sequential character sets, and
  2. means for determining the actual frequency of occurrence further comprises determining a set of actual rates at which each of the plurality of sequential character sets occur in the sequence of characters of the text message; and
 b. the means for comparing further comprises means for matching the set of actual rates with one of the plurality of corecurrence libraries.

19. The messaging system as claimed in claim 18, wherein the means for matching the set of actual rates includes:
 a. means for comparing the set of actual rates at which each of the plurality of sequential character sets occur in the sequence of characters of the text message with a plurality of reference occurrence frequencies for the sequence of characters wherein each reference occurrence frequency corresponds to one of the plurality of corecurrence libraries; and
 b. means for determining a closest match between the set of actual rates and one of the reference occurrence frequencies.

20. A voice messaging system for providing voice messaging services to a set of subscribers, the voice messaging system comprising:
 a. means for retrieving a text message;
 b. means for automatically generating a language identifier corresponding to the text message, wherein the means for generating includes means for comparing an actual frequency of occurrence of character combinations within a sequence of characters of the text message with a plurality of reference frequencies wherein each reference frequency corresponds to a particular corecurrence library;
 c. means for converting the text message directly into computer-generated speech, wherein the means for converting uses a language-specific text-to-speech engine that is selected based upon the language identifier; and
 d. means for playing the computer-generated speech to a subscriber.

21. The voice messaging system according to claim 20, further comprising a voice gateway server configured to be connected to a computer network and a Private Branch Exchange, wherein the voice gateway server facilitates the exchange of messages between the computer network and the Private Branch Exchange.

22. A method of operating language-based conversion of a present text message into speech, the method comprising the following steps:
 a. retrieving the present text message;
 b. automatically generating a language identifier corresponding to the present text message, wherein the step of generating includes:
  (1) examining a sequence of characters of the present text message;
  (2) determining an actual frequency of occurrence of the sequence of characters within the present text message; and
  (3) matching the actual frequency of occurrence of the sequence of characters with one of a plurality of corecurrence libraries, wherein each of the plurality of corecurrence libraries corresponds to a different language;

c. selecting an appropriate one text-to-speech engine from a plurality of text-to-speech engines wherein each of the plurality of text-to-speech engines corresponds to one of a plurality of languages and the appropriate one text-to-speech engine is selected based upon the language identifier;

d. converting the present text message directly into computer-generated speech in response to the appropriate text-to-speech engine; and e. playing the computer generated speech to a subscriber.

23. The method as claimed in claim 22, wherein the step of matching the actual frequency of occurrence includes:

a. comparing the actual frequency of occurrence of the sequence of characters within the present text message with a plurality of reference occurrence frequencies for the sequence of characters, wherein each reference occurrence frequency corresponds to one of the plurality of corecurrence libraries, and b. determining a closest match between the actual frequency of occurrence of the sequence of characters and one of the reference occurrence frequencies.

24. The method as claimed in claim 22, wherein:

a. the step of examining the sequence of characters further comprises dividing the sequence of characters of the present text messages into a plurality of sequential character combinations;

b. the step of determining the actual frequency of occurrence further comprises determining a set of actual rates at which each of the plurality of sequential character combinations occur in the sequence of characters of the present text message; and c. the step of matching the actual frequency of occurrence further comprises matching the set of actual rates with one of the plurality of corecurrence libraries.

25. The method as claimed in claim 24, wherein the step of matching the set of actual rates includes:

a. comparing the set of actual rates at which each of the plurality of sequential character combinations occur in the sequence of characters of the present text message with a plurality of reference occurrence frequencies for the sequence of characters, wherein each reference occurrence frequency corresponds to one of the plurality of corecurrence libraries, and b. determining a closest match between the set of actual rates and one of the reference occurrence frequencies.

* * * * *

UNITED STATES PATENT AND TRADEMARK OFFICE
CERTIFICATE OF CORRECTION

PATENT NO.   : 6,487,533 B2
DATED        : November 26, 2002
INVENTOR(S)  : Hyde-Thomson et al.

It is certified that error appears in the above-identified patent and that said Letters Patent is hereby corrected as shown below:

<u>Title page,</u>
Item [56], References Cited,
The following U.S. PATENT DOCUMENTS need to be added:

| | | | | | |
|---|---|---|---|---|---|
| -- | 4,935,954 | 06/19/90 | Thompson et al. | 379/89 | |
| | 5,204,894 | 04/20/93 | Darden | 379/88 | |
| | 5,452,340 | 09/19/95 | Engelbeck et al. | 379/67 | |
| | 5,493,608 | 02/20/96 | O'Sullivan | 379/88 | |
| | 5,717,738 | 02/10/98 | Gammel | 379/67 | |
| | 5,825,856 | 10/20/98 | Porter et al. | 379/93.12 | -- |

The following U.S. PATENT DOCUMENTS need to be replaced:
replace "5,963,518" with -- 5,963,618 --.

Signed and Sealed this

Twentieth Day of May, 2003

JAMES E. ROGAN
*Director of the United States Patent and Trademark Office*